United States Patent [19]

De shen

[11] Patent Number: 4,649,902
[45] Date of Patent: Mar. 17, 1987

[54] SOLAR COLLECTOR

[76] Inventor: Chen De shen, 1464 Morton Pl., Los Angeles, Calif. 90026

[21] Appl. No.: 813,202

[22] Filed: Dec. 24, 1985

[51] Int. Cl.$^4$ ................................................ F24J 3/02
[52] U.S. Cl. .................................. 126/433; 126/417; 126/449
[58] Field of Search ............... 126/433, 449, 417, 426, 126/444; 165/104.17, 104.21, 104.26; 62/235.1

[56] References Cited

U.S. PATENT DOCUMENTS

| | | | |
|---|---|---|---|
| 3,875,925 | 4/1985 | Johnston | 126/449 X |
| 4,175,542 | 11/1979 | Duchene | 126/449 |
| 4,198,956 | 4/1980 | Soleau, Jr. | 126/444 |
| 4,267,821 | 5/1981 | Nelson | 126/449 X |
| 4,306,542 | 12/1981 | Reinet | 126/449 X |
| 4,311,131 | 1/1982 | Sabet . | |
| 4,313,423 | 2/1982 | Mahdjuri . | |
| 4,337,756 | 7/1982 | Serapioni | 126/444 X |
| 4,344,824 | 8/1982 | Solean, Jr. . | |
| 4,437,456 | 3/1984 | Merrigan . | |
| 4,438,759 | 3/1984 | Kitajima et al. . | |
| 4,459,976 | 7/1984 | Speros . | |
| 4,479,488 | 10/1984 | Steinberg . | |

FOREIGN PATENT DOCUMENTS 2079930  1/1982  United Kingdom .

OTHER PUBLICATIONS

A Noval Solar Collector, Caouris et al., Solar Energy, vol. 21 pp. 157–160.
A Flat Plate Multiple Pass Solar Collector Using Aqueous Optical Properties, Antrim et al., Proceedings of the Society of Photo-Optical Instrumentation Engineers, vol. 161, Optics Applied to Solar Energy IV pp. 29–35, Aug. 1978.

Primary Examiner—Larry Jones
Attorney, Agent, or Firm—Staas & Halsey

[57] ABSTRACT

A solar collector has first and second windows and an absorber behind the second window. A layer of material is provided on the interior surface of the first window, to which a fluid is supplied for dispersal throughout the material, and from which the fluid is vaporized to the space between the windows. The vapor passes into the absorber where it is heated by the solar energy being absorbed, and is then supplied to a heat transfer element which carries away the heat while recondensing the vapor. The condensed fluid can be returned to the interior surface of the first window for recycling. The fluid vaporizing from the interior of the first window results in a relatively front cool surface of the collector, which accordingly can have a corresponding high efficiency, even though the interior of the collector is at a high temperature. The heat of vaporization can be supplied in significant part, depending on conditions, by conduction from the ambient atmosphere at the exterior surface of the first window, for instance during summer. Providing a further window with the material layer for the fluid vaporization has advantages for year-round operation.

13 Claims, 9 Drawing Figures

SOLAR COLLECTOR

BACKGROUND OF THE INVENTION

Solar collectors convert solar insolation into usable heat at a useful temperature.

Known solar panel collectors have as typical components a window for reducing the heat loss and passing the solar insolation and an absorber for absorbing the insolation passed by the window(s). A heat transfer fluid such as air or water is typically made to flow through passages in the absorber, or to flow in thermal contact with a surface of the absorber, for removing the heat from the absorber to supply it for the intended purpose.

A disadvantage of such prior art solar collectors is that heat losses occur due to radiation and conduction of heat from the window, absorber or other component. Also, if the working fluid above is a liquid, the temperature of the heat delivered by the solar collector can be limited by the boiling point of the liquid. Further, the maximum amount of delivered heat is limited by the incident insolation.

SUMMARY OF THE INVENTION

The collection of solar energy with low loss and delivery of the converted heat at high temperatures can be accomplished according to the present invention by incorporating a fluid vaporization cycle within the collector.

According to the present invention, some heat at the ambient temperature of the surrounding atmosphere and a part of the heat of the solar insolation can be used to vaporize the fluid, and the vapor is subsequently heated, by the rest of the solar insolation that is absorbed, to supply the heat according to the design temperature at the external conditions.

According to the present invention, a window has on its interior surface a layer of for instance a porous material, or of a material which otherwise has an affinity for the fluid and which serves to disperse the fluid, to serve as a stratum from which the fluid then vaporizes. The layer of material as impregnated with the fluid should largely allow the solar insolation to pass through to the absorber.

According to the present invention, the vaporized fluid is heated to a high temperature, according to design parameters and available insolation, etc. after which the vapor can be recondensed and returned to the layer of material for recycling. Particularly in summer, the atmosphere at ambient temperature in contact with the exterior surface of the window can significantly contribute heat for vaporizing the fluid, and the window is thusly kept at a low temperature as compared to the absorber.

According to one embodiment of the present invention, two windows can be used, each with the layer of material on its interior surface from which the fluid vaporizes, to provide for vaporization mainly from the interior window during seasons when the ambient temperature is sufficiently low to decrease the rate of fluid vaporization from the interior surface of the exterior window in contact with the cooler atmosphere. On the other hand, when the ambient temperature is sufficiently warm to enable vaporization for the exterior window as well, vaporization can occur from the interior surface of both windows having the layer of the material.

According to an embodiment of the present invention, the absorber, together with means for recondensing the vapor, serves to pump the vapor between the location where it vaporizes to the location where it condenses, while the vapor is heated by the absorber to provide the collected heat at a high temperature as desired.

DESCRIPTION OF PREFERRED EMBODIMENTS

Figure 1:
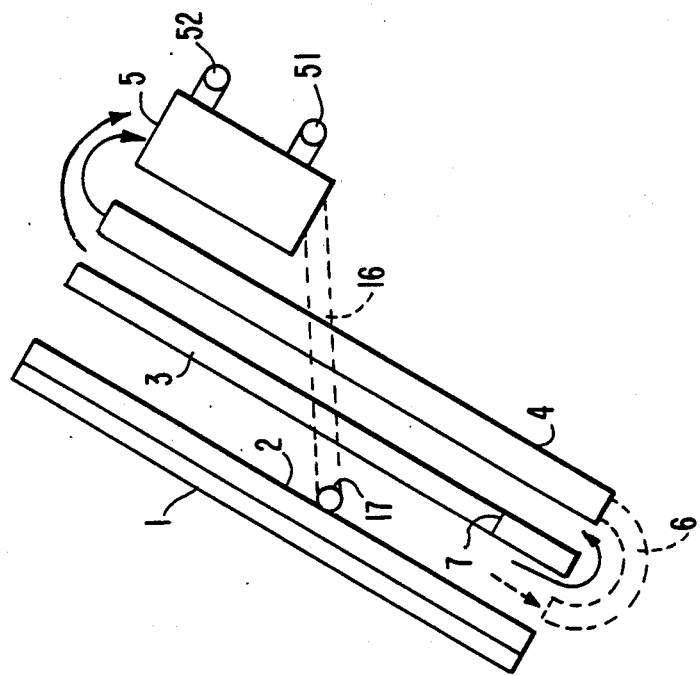
FIG. 1 illustrates schematically the present invention.

Principles of the present invention are illustrated schematically in FIG. 1, wherein the window 1, preferably of glass for its structural and infrared absorption characteristics, has on its interior surface a layer of material 2 which serves to support and disperse a fluid to be vaporized, such as by capillary or other wetting or distributing action, while allowing the solar insolation to largely pass onward through for instance a further transparent window 3 to the absorber 4. As indicated by the arrows, the vapor of the fluid from the layer of material 2 is allowed to pass by some manner from the space between the two windows 1 and 3 to flow past or through the absorber 4. The absorber 4 heats the vapor and delivers it to a heat exchange means 5, from which the solar heat is taken at the temperature of delivery.

The heat exchange means 5 can recondense the vapor to the fluid, which can be fed back via for instance the return line 16 (shown with dotted lines in FIG. 1) to the layer of material 2 for repeating the cycle. A fluid distribution line 17, shown only in cross-section in FIG. 1, such as circular pipe cut lengthwise and held against the layer of material 2, extends for instance across the width of the window 1, for distributing the fluid to the layer of material 2.

The layer of material 2 is for instance of cloth, tissue, silk, etc., or is some type of frosted film, and is preferably of a non-decomposing material such as glass or plastic fibers, in the form of a web, a continuous sheet, etc. The layer of material can be continuously attached to the interior surface of the window 1, or spot-wise attached and held in contact by capillary action of the fluid, etc. Alternatively, the interior surface of the window 1 can be treated such as by etching or otherwise to provide a porous substrate for supporting and distributing the fluid to be vaporized.

Since the window 1 is in thermal contact with the ambient atmosphere, ambient heat can be conducted from the exterior atmosphere through the window 1 and thus supply at least a part, and a major part under some conditions according to the present invention, of the heat of vaporization of the fluid being vaporized from the layer of material 2.

The vapor originating between the windows 1 and 3 is subsequently introduced preferably into the bottom of the absorber 4, so that the vapor is heated while it rises in contact with the absorber, as indicated by the arrows in FIG. 1.

The return line 16 is arranged to be sufficiently high to feed back the condensed fluid to the layer of material 2 at a point on the interior of the window 1 to allow the condensed fluid to be distributed throughout the layer of material 2 for subsequent vaporization.

Since the window 1 can thus be held at a relatively low temperature, as compared for instance to the temperature of the absorber 4, there is little or no conductive loss to the ambient atmosphere as in the prior art above, and infrared radiation reradiated from the hot absorber 4 can be absorbed by the glass of the window 1 and used for vaporizing the fluid from the layer of material 2. Further, by selecting the fluid to be vaporized and the design parameters according to the conditions for the intended operation, the heat of vaporization can be supplied in part from the ambient atmosphere, namely by conduction through the window 1, so that a major part of the solar insolation can be used for heating the vapor. Both the heat of vaporization and the heat from the absorber can be recuperated in the heat exchange means 5, and thus provided as useful heat. If the invention is to be provided as a sealed unit, appropriate provision can be foreseen such as for maintaining pressure within an acceptable range according to temperature variation and amount of vaporized fluid, etc. Further, open cycle features can be provided such as for draining the fluid for avoiding freezing problems, or for automated resupply of liquid, depending on each specific applications. Water is a preferred embodiment of the fluid to be supplied to the layer of material 2 to be vaporized, and a chemical can be added to the water to avoid freezing problems in cold weather.

The tube 6 shown with a dotted line in FIG. 1 indicates one alternative method of supplying the vapor from the space between the windows 1 and 3 to the absorber 4. Alternatively, instead of use of the tube 6, the bottom of the window 3 could be cut off at the position indicated by the line 7 in FIG. 1, and the vapor allowed to pass by itself into the bottom of the absorber 4 to be heated while rising through the absorber 4, etc. The window 3 and any of the other windows in the present invention can be of glass, or of a known plastic, epoxy, etc. material. The heat exchange means 5 has inlet 51 and outlet 52 for flowing therethrough a heat transfer fluid for removing the supplied heat, and for condensing the vapor back to the fluid.

Figure 2:
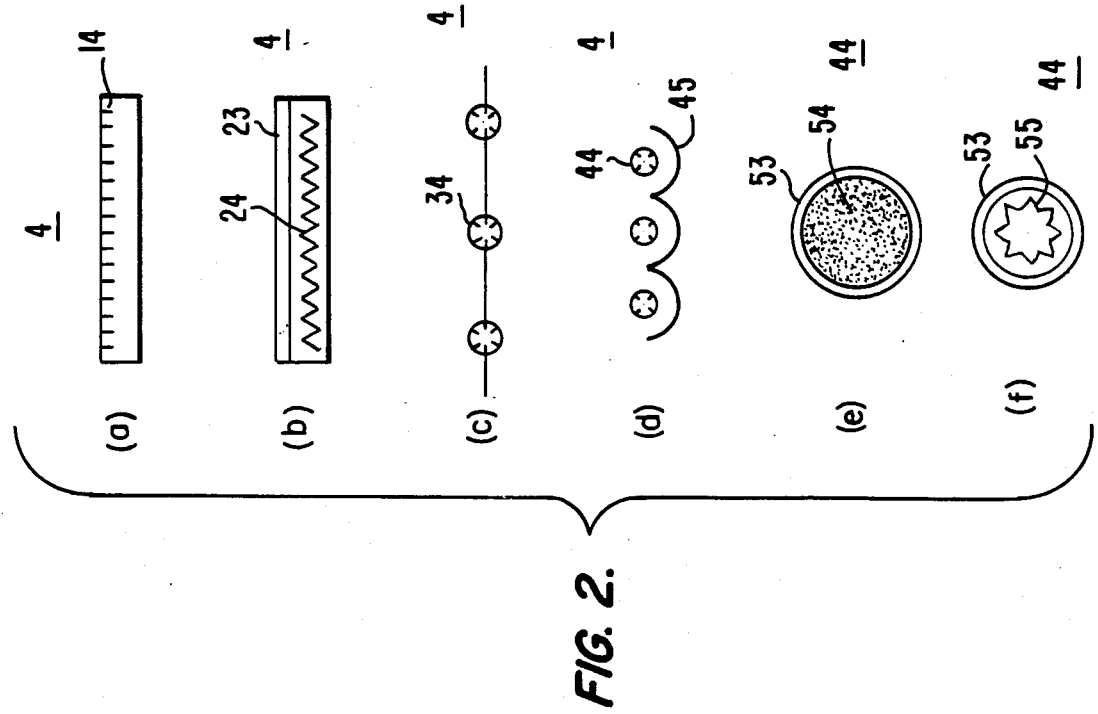
FIGS. 2(a) to 2(f) show alternative embodiments for the absorber of the present invention.

FIG. 2(a) shows in cross-section a flat-panel configuration for the absorber 4 with interior fins 14 for transferring the heat to the vapor, and FIG. 2(b) shows a flat absorber formed with a further window 23 for passing the solar insolation to be absorbed by an absorbing element 24, located in the passage where the vapor to be heated can flow on all sides of the absorbing element 24. FIG. 2(c) shows in cross-section a flat plate absorber 4 having tubular passages 34 which can include fins such as fins 14 in FIG. 2(a) for conducting the heat to the vapor. FIG. 2(d) shows the absorber 4 made of tubular absorbing elements 44 at the concentrating areas of reflectors 45. FIGS. 2(e) and 2(f) show embodiments of the tubes 44 of FIG. 2(d), made of glass tubes 53 filled respectively with a dispersed absorber 54 such as of dark fiber, or a shaped absorber 55 such as of metal or paper selected or coated for absorbing the insolation, and through which vapor in the glass tube 53 can pass.

Figure 3:
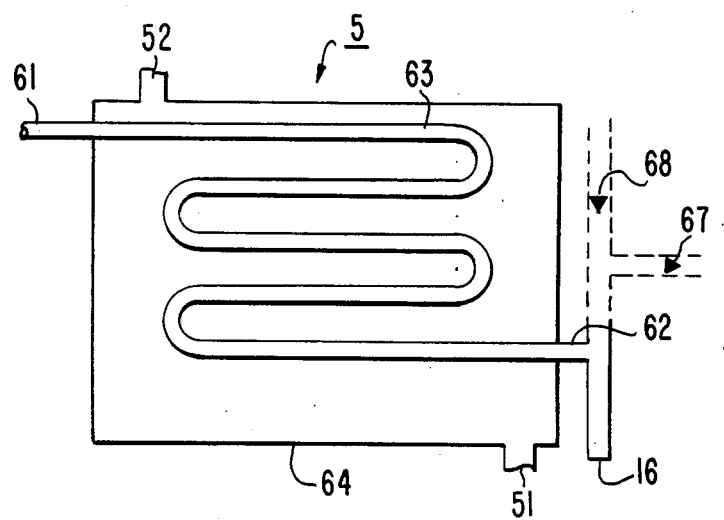
FIG. 3 shows an embodiment of the heat transfer and vapor condensation element of the present invention.

FIG. 3 shows in cut-away exposed view an embodiment of the heat exchange means 5, in the form of a snake-transfer tube 63, with an inlet 61 for the hot vapor, which travels along the tube 63 in the box 64, and an outlet 62 from out of which the recondensed fluid can emerge to return to the layer of material 2 via the return line 16, while the delivered heat is provided out the outlet 52 of the box 64 in the heat transfer fluid that enters the box 64 at the inlet 51. As shown by dotted lines in FIG. 3, connected to the outlet 62 of the snake-transfer tube 62 can be provided a one-way valve or a relief valve 67 for venting for instance only air or vapor to the atmosphere, and further a one-way valve or a relief value 68 for letting in air to relieve any vacuum condition that might arise during any specific operation depending on actual conditions in any application of the present invention.

Figure 4:
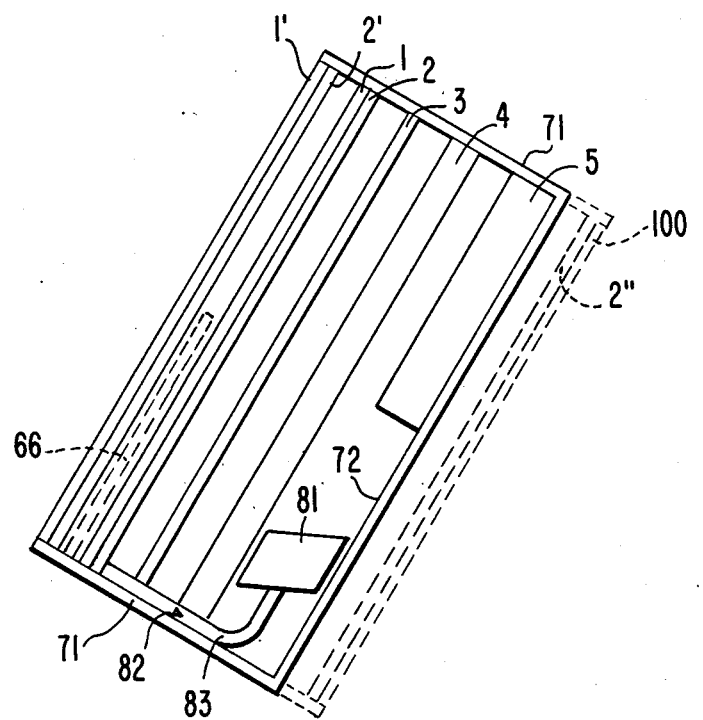
FIG. 4 illustrates schematically a solar collector having two windows from which fluid vaporizes, for providing operation with seasonally varying temperatures of the ambient atmosphere.

FIG. 4 shows schematically a solar collector unit in an insulated casing having sides 71 and a back 72, wherein two windows 1 and 1' are provided, each with a layer of material 2 and 2' on its interior surface. The illustrated components of FIG. 4 are connected for instance according to the description above, such as both layers of material 2 and 2' being supplied with the condensed fluid by the return line 16, and each window 1, 1' having a respective distribution line 17, which features are not repeated in FIG. 4. Similarly, a vapor line 6 as in FIG. 1 can feed the vapor from the spaces between the respective windows 1 and 1', and 1 and 3, to the absorber 4.

The unit can incorporate as well any other features as would be understood by a skilled in the art, depending on the operating conditions and the design for each specific application. For instance, FIG. 4 shows the small tank 81 for providing a reservoir of additional fluid, which can be controlled to flow to the layer of material 2 (or 2', not shown) in the line 83 for instance by the valve 82. The valve 82 can be operated for instance according to pressure or temperature, to allow replenishment of the fluid supply to be vaporized. For instance, the valve 82 can be operated according to the temperature of any air or vapor being released at the valve 67 above the outlet 62 of the snake-transfer tube 63 of FIG. 3, or controlled so as to prevent supply of additional fluid to the material layers 2, 2' when the heat transfer fluid flowing to the heat exchange means 5 is interrupted and sufficient condensation does not occur, etc. The tank 81 is refillable from outside the unit. Alternately, the heat exchange means 5 and the tank 81, etc. can be provided outside the unit.

An advantage of the unit of FIG. 4 is as follows. The fluid to be vaporized typically is required to be at some minimum temperature for its vapor pressure to be sufficient to provide sufficient vapor. For water this can be roughly 20°-30° C. Thus during cold weather the window 1' at the exterior of the unit shown in FIG. 4 may be sufficiently cold that the amount of vapor produced at its interior surface is relatively much less than that from the interior surface of the interior window 1. However, in hot weather, vapor from both windows 1 can contribute to the vapor supplied to the absorber 4. Alternately, instead of the back 72 of the insulated casing, as shown by the dotted lines in FIG. 4, a layer of conducting material 100 can allow conduction of ambient heat to vaporize the fluid supplied as above to a layer of material 2" at the interior surface of the layer 100. Thus, the back of a solar collector can be kept cool while adding to its total heat output.

As shown by dotted lines in FIG. 4, an extension 66 of the vapor line 6 of FIG. 1 can extend up into the space between the windows 1' and 1, and between the windows 1 and 3, as desired.

I claim:

1. A solar collector comprising
   a first window for passing solar insolation,
   a layer of material located on the interior surface of said first window, said layer of material comprising means for supporting and distributing a fluid to be vaporized therefrom while passing at least in part said solar insolation,
   an absorber spaced behind said first window with said material layer, for absorbing the solar insolation which reaches said absorber, to receive and heat said vapor, and to output heated vapor, and
   supply means for supplying said fluid to said layer of material to be vaporized.

2. The collector of claim 1, comprising a second window located between and spaced from both said first window with said layer of material and said absorber.

3. The collector of claim 2, comprising means for supplying the vapor from the space between said first and second windows to the bottom of said absorber, wherein said vapor supplied to said absorber rises while being heated by said absorber.

4. The collector of claim 3, comprising heat transfer means for receiving said heated vapor from said absorber and for condensing said vapor.

5. The collector of claim 4, said supply means comprising a return line connected to receive condensed fluid from said heat transfer means, and a distribution line, in contact with said layer of material and connected to receive said fluid from said return line, for distributing said fluid to said layer of material.

6. The collector of claim 1, comprising a further one of said first windows with said layer of material, wherein said layer of material of said further first window is also supplied with said fluid, and the vapor therefrom is also provided to said absorber.

7. The collector of claim 2, comprising a further one of said first windows with said layer of material, wherein said layer of material of said further first window is also supplied with said fluid, and the vapor therefrom is also provided to said absorber.

8. The collector of claim 5, comprising a further one of said first windows with said layer of material, wherein said layer of material of said further first window is also supplied with said fluid, and the vapor therefrom is also provided to said absorber.

9. The collector of claim 8, comprising a tank for providing a reservoir of said fluid, and means for controlling the supply of said fluid of said reservoir to at least one of said layers of material.

10. The collector of claim 8, comprising an insulated casing to provide a sealed unit, and pressure relief means for maintaining the pressure within said sealed unit within a predetermined range.

11. The collector of claim 8, comprising on the back of the collector a layer of a conductive material in contact at its exterior surface with the ambient atmosphere, and having a layer of said material for vaporizing said fluid on the interior surface of said layer of conductive material, wherein said fluid is provided also to said layer of material of said layer of conductive material, and the vapor therefrom is also supplied to said absorber.

12. The collector of claim 1, said absorber comprising a plurality of reflectors and a respective plurality of absorbing tubes at the concentrating areas of said reflectors, wherein said vapor flows in said absorbing tubes.

13. The collector of claim 12, each said absorbing tube comprising a glass tube and an absorbing element with the tube.

* * * * *